United States Patent

Dorski et al.

[11] Patent Number: 5,154,576
[45] Date of Patent: Oct. 13, 1992

[54] COOLANT PUMP DRIP COLLECTOR WITH IMPROVED CAPACITY

[75] Inventors: Ronald L. Dorski, Castalia; Steven F. Baker, Bellevue; John L. Turner, Sandusky; Brent R. Behrman; Joseph L. Tengowski, both of Norwalk, all of Ohio

[73] Assignee: General Motors Corporation, Detroit, Mich.

[21] Appl. No.: 767,186

[22] Filed: Sep. 30, 1991

[51] Int. Cl.[5] .............................................. F01D 25/00
[52] U.S. Cl. .................... 415/168.2; 417/362; 417/423.11; 277/23
[58] Field of Search ............... 415/168.1, 168.2, 169.1; 417/362, 423.11; 277/23; 210/248

[56] References Cited

U.S. PATENT DOCUMENTS

| | | | |
|---|---|---|---|
| 823,077 | 6/1906 | Pitman | 415/168.1 |
| 2,191,917 | 2/1940 | Sheldrick | 415/168.2 |
| 2,375,085 | 5/1945 | Curtis | 415/168.2 |
| 3,549,277 | 12/1970 | DeKiss et al. | 415/168.2 |
| 4,380,416 | 4/1983 | Menager | 415/168.2 |
| 4,722,662 | 2/1988 | Morgan | 415/168.2 |
| 5,071,316 | 12/1991 | Diem et al. | 415/168.1 |

*Primary Examiner*—John T. Kwon
*Attorney, Agent, or Firm*—Patrick M. Griffin

[57] ABSTRACT

A channel type vehicle water pump drip collector provides improved efficiency and capacity and a simple installation. The internal volume enclosed by a retainer that is snap fitted onto the housing is filled with an absorbent material. Leaking coolant is soaked up, rather than puddling at the bottom of the channel. Therefore, a leak proof, welded connection is not needed. In the embodiment disclosed, a retainer for the ring is attached by flexible teeth, and the spaces between the teeth provide air vents through which absorbed coolant may gradually evaporate to the outside.

3 Claims, 3 Drawing Sheets

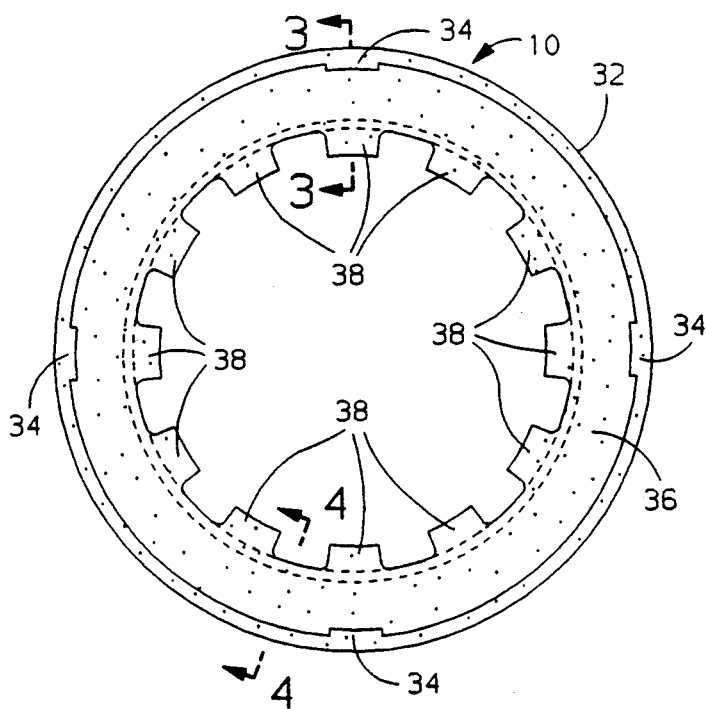
FIG.2
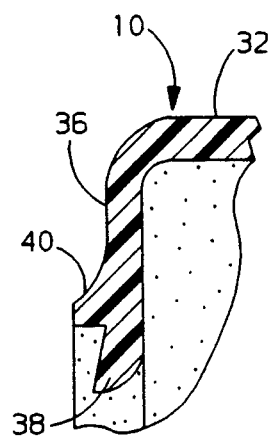
FIG.3
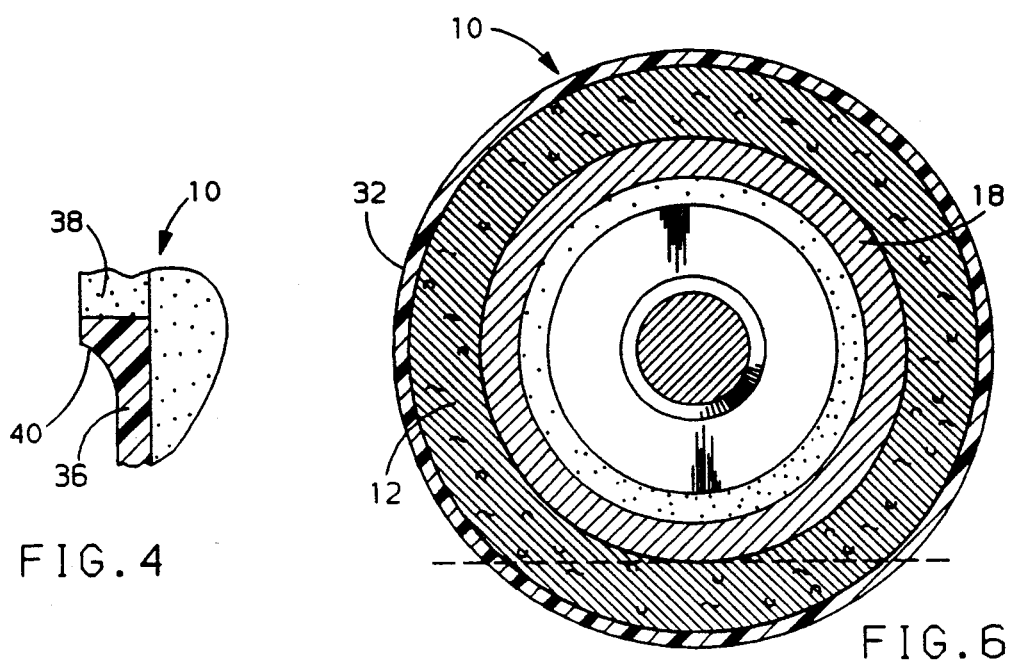
FIG.4
FIG.6

4,154,576

COOLANT PUMP DRIP COLLECTOR WITH IMPROVED CAPACITY

This invention relates to vehicle coolant pumps in general and specifically to a pump drip collector that has an improved capacity.

BACKGROUND OF THE INVENTION

Vehicle coolant pumps, often referred to as water pumps, have a ball bearing supported pump shaft that extends out of the pump housing through a coolant retaining seal. Some coolant normally leaks past the seal which, if it were not allowed to escape, could reach the shaft bearing. Therefore, the pump housing typically has coolant vent holes between the coolant seal and the shaft bearing. Without a drip collector of some sort, leaked coolant draining from the vent holes would fall to the ground, or perhaps puddle on some part of the engine block. While the normal, expected volume of coolant leakage presents no safety or operational problems, it is undesirable from an aesthetic stand point, and it could send a false signal regarding the condition of the coolant seal, precipitating an early and unnecessary replacement. Therefore, various drip collectors have been used, or proposed to catch and hold the vented coolant long enough for it to evaporate to the air. Such drip collectors typically take the form of a cup that rests beneath the coolant vent hole.

In one type of pump, the pump housing consists of two basic elements, a dish shaped stamping that is bolted to the engine and a cylindrical shaft bearing race that protrudes horizontally from the stamping. The vent holes are drilled through the bearing race, set back axially from a flat front face of the stamping. This type of pump housing lends itself well to a channel or gutter shaped drip collector of U-shaped cross section that surrounds the bearing race, covering the vent holes. One lip of the channel is radially spaced away from the bearing race, so that there is a continuous open evaporation path to the outside air. Leaking coolant runs down to the bottom of the channel, where it collects only until it is deep enough to overrun the lip of the channel. As such, the vast majority of the internal volume of the channel cannot actually be used to collect leaked coolant.

SUMMARY OF THE INVENTION

The invention provides a channel type drip collector in which most of the internal volume is available for leakage collection.

In the preferred embodiment disclosed, a generally cylindrical retainer has an outer cylindrical wall larger in diameter than the bearing race and longer than the axial setback of the vent holes. At the inner end of the cylindrical wall, a circular edge is shaped to closely abut the face of the pump housing, while at the outer end, a radially inwardly extending flange has a circular inner edge adapted to grip the bearing race. Specifically, the inner edge comprises a series of circumferentially spaced teeth that snap into a circular groove machined into the outer surface of the bearing race.

When the retainer is pushed over the bearing race, the teeth flex out until they snap into the groove. The inner edge of the outer wall abuts the face of the pump housing, but is not attached directly to the pump housing. Therefore, while the retainer creates an enclosed internal volume in cooperation with the face of the pump housing, it is not a sealed volume that can hold collect coolant by itself. Instead, a ring of absorbent felt material, trapped between the flange of the retainer and the face of the pump housing, absorbs coolant that otherwise drain out of the vent holes. Essentially the whole internal volume can be filled through the wicking action of the ring. The spaces between the teeth act as air vents to allow the absorbed coolant to gradually evaporate out of the ring and into the air. In addition, the felt acts to filter any outside air that is drawn in o the bearing race through the vent holes.

It is, therefore, a general object of the invention to provide a more efficient channel type coolant pump drip collector.

It is another object of the invention to provide such a drip collector that has an increased capacity.

It is another object of the invention to provide a channel type drip collector in which a leak tight connection between the collector and the pump housing is not needed.

It is another object of the invention to provide increased capacity for the drip collector through the use of an adsorbent material that fills most of the enclosed internal volume.

It is still another object of the invention to provide such a collector in which a series of spaced teeth on the inner edge of a retainer grip the pump housing while also providing air vents through which the absorbed coolant can later evaporate.

DESCRIPTION OF THE PREFERRED EMBODIMENT

These and other objects and features of the invention will appear from the following written description, and from the drawings, in which:

FIG. 2 is an axial view of the inside of the retainer alone;

FIG. 3 is an enlargement of a cross section taken along the line 3—3 of FIG. 2;

FIG. 4 is an enlargement of a cross section taken along the line 4—4 of FIG. 2;

FIG. 6 is a sectional view of the drip collector taken along the line 6—6 of FIG. 5.

Figure 1:
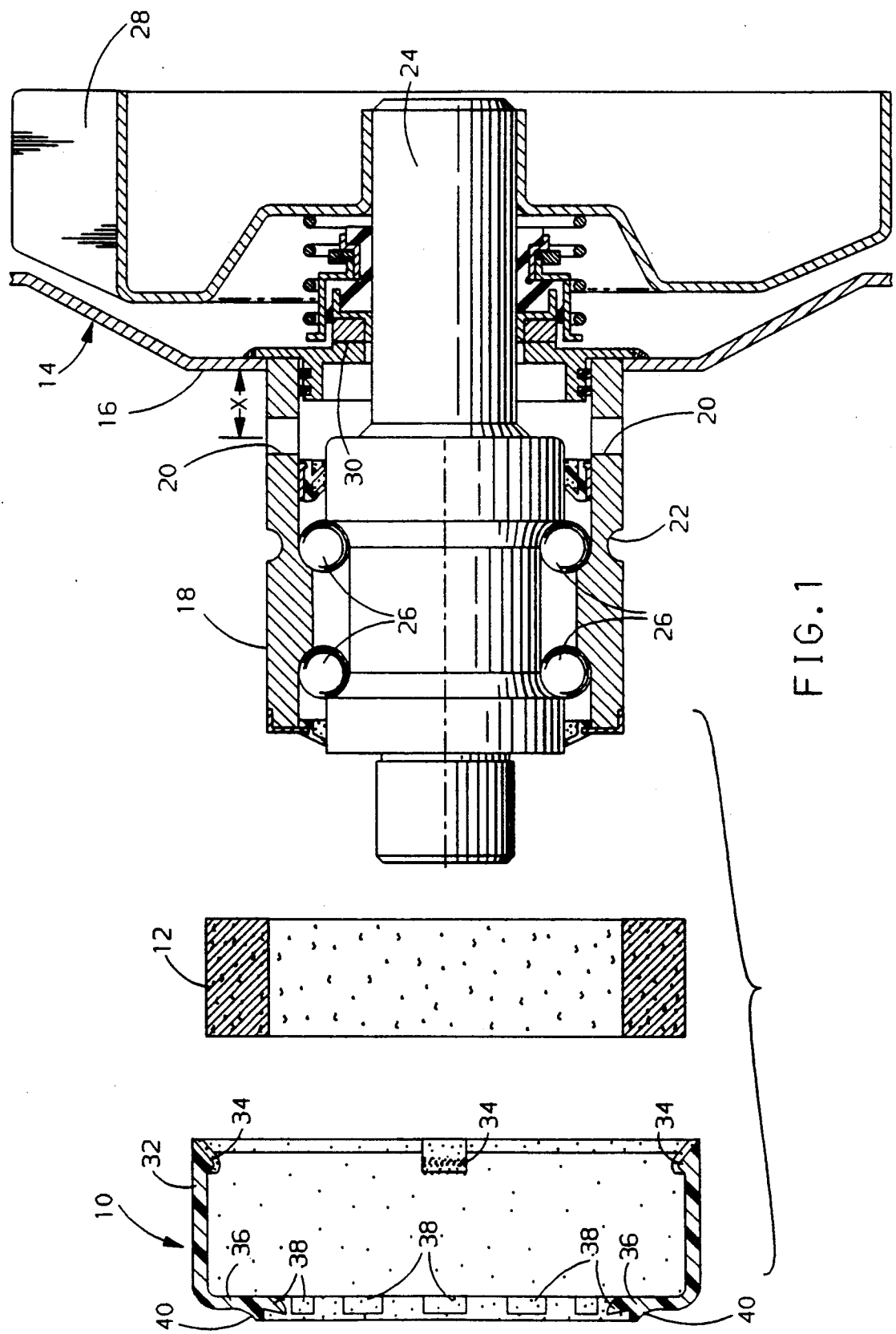
FIG. 1 shows a cross section of a pump housing and bearing race with the retainer and felt ring removed.

Referring first to FIG. 1, a preferred embodiment of the drip collector of the invention comprises a retainer, indicated generally at 10, and an absorbent felt ring 12, which are to installed to a pump housing, indicated generally at 14. Pump housing 14 includes a steel stamping with a flat front face 16, which is bolted to an engine block, not illustrated. Protruding horizontally from the housing face 16 is a cylindrical bearing race 18, through which a pair of antipodal vent holes 20 are drilled. The vent holes 20 are set back a predetermined axial distance from the pump housing face 16, approximately ten mm. in the embodiment disclosed. A circular retention groove 22 is cut into the surface of bearing race 18, parallel to and about twenty mm. away from pump housing face 16, for a purpose described below. A pump shaft 24 is rotatably supported within bearing race 18 by a double row of bearing balls 26. Shaft 24 supports an impeller 28 at its inner end, and emerges from the pump housing 14 through a surrounding coolant seal 30. In normal operation, seal 30 leaks a small amount of coolant, which drains through the lower vent hole 20 before it can reach the bearing balls 26. While the upper vent hole 20 cannot drain leaked coolant, it does aid in the evaporation of any residual leakage that does not drain out.

Referring next to FIGS. 2, 3, and 4, retainer 10 is, in the embodiment disclosed, a molded plastic drum with an cylindrical outer wall 32 that is larger in diameter than bearing race 18, and substantially as long as the axial set back of groove 22. The inner end of wall 32 is a circular edge 34 that lies in a plane perpendicular to the central axis of wall 32. Its outer end comprises a radially inwardly extending annular flange 36, the inner edge of which comprises a plurality of circumferentially spaced teeth 38. The teeth 38 are flexible, especially so since they are molded of plastic, and their inner edges all lie on a common circle with a diameter equal to the diameter of the retention groove 22. In addition, an outwardly sloped circular ridge 40 surrounds the teeth 38, for a purpose described below. Ring 12 is approximately as thick as the outer wall 32 is long and approximately as wide as the diameter difference between outer wall 32 and bearing race 18. As a practical matter, ring 12 would likely be rolled up from an initially flat strip of material into the ring shape shown.

Figure 5:
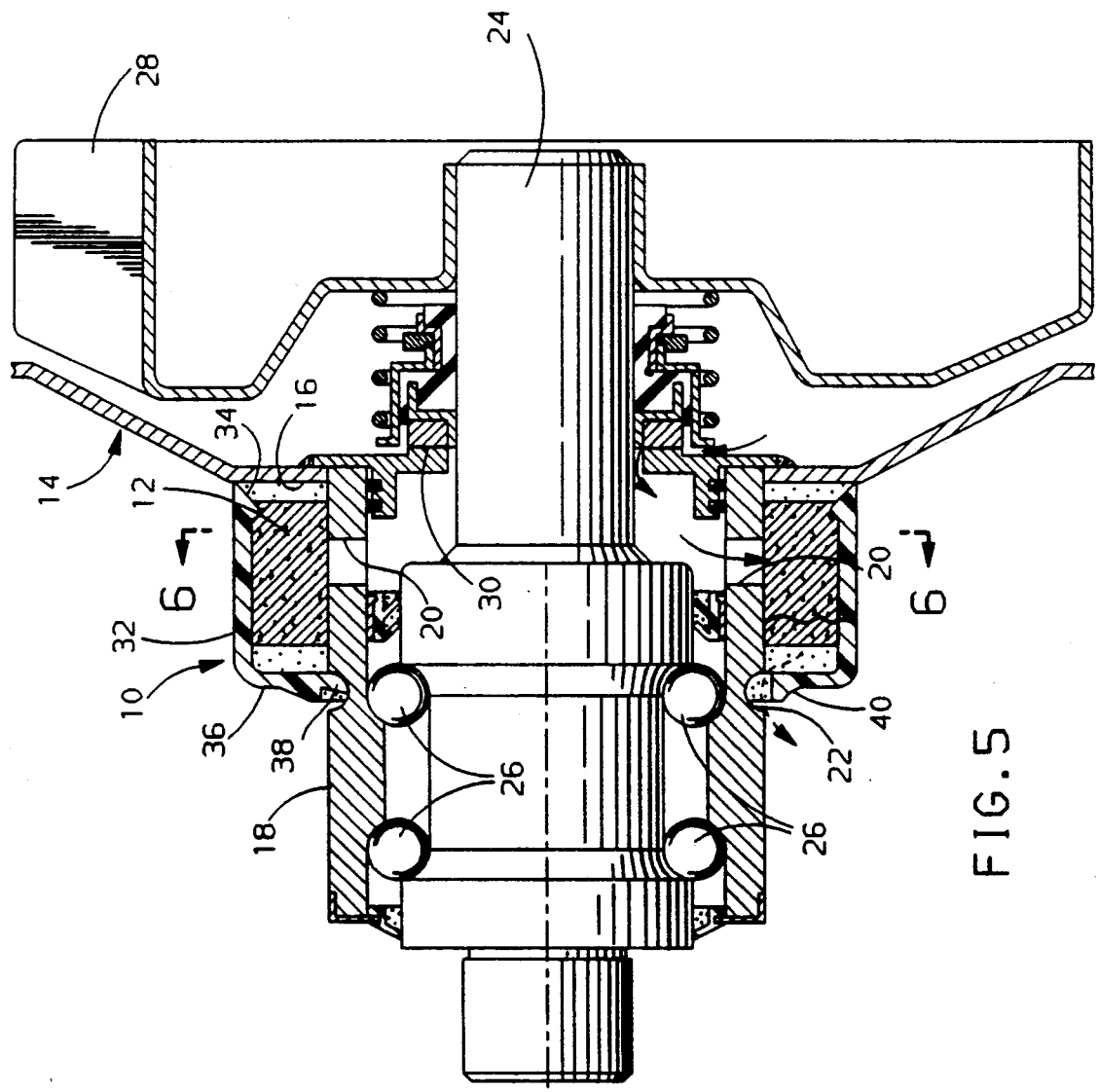
FIG. 5 is a view like FIG. 1, but showing the drip collector fully assembled.

Referring next to FIG. 5, retainer 10 and ring 12 are shown installed. Felt ring 12 is first placed inside of retainer 10, after which retainer 10 is pushed over bearing race 18, with inner edge 34 leading. As the teeth 38 contact and slide along the outer surface of bearing race 18, which has a slightly larger diameter, they bow slightly outwardly. As the inner end edge 34 abuts pump housing face 16, the teeth 38 snap into retention groove 22. Retainer 10 thereby securely grips the bearing race 18, creating an enclosed volume in cooperation with pump housing face 16. Ring 12 is confined and protected within that volume, and substantially fills it, given its size. Consequently, ring 12 surrounds and closely covers both vent holes 20. Significantly, the retainer inner end edge 34 is not directly fixed to the pump housing face 16, thereby avoiding a welding or adhesion operation. While a leak proof connection between retainer 10 and pump housing 14 does not exist, it is not necessary.

Referring next to FIGS. 5 and 6, the operation of the drip collector created by the installed retainer 10 and trapped felt ring 12 is illustrated. When coolant leaks past the seal 30, as shown by the arrows, it is absorbed into the felt ring 12, rather than puddling and collecting at the bottom. Ring 12 is large enough to absorb the normal expected volume of coolant leakage. Even though the felt ring 12 occupies most of the internal volume, the capacity of the drip collector is actually increased, as compared to an empty channel. Without the felt ring 12, even assuming a leak tight connection between edge 34 and pump housing face 16, collected coolant could rise only to the relatively low level indicated by the dotted line, after which it would run over and out. With the felt ring 12, coolant can soak up throughout essentially the entire available internal volume. Once absorbed, the coolant can evaporate from ring 12 into the outside air through the spaces between the teeth 38, which provide air vents. Even if the entire ring 12 is soaked, a constant proportion of its area is presented to the outside air for evaporation. The continuous ridge 40 helps to shelter the area of ring 12 that is exposed between the teeth 38 from outside water entry. The felt ring 12 also serves as a dust filter should a negative pressure develop with bearing race 18, since any outside air drawn in through the vent holes 20 would first pass through it.

Variations in the embodiment disclosed could be made. Even if increased collection capacity were not needed, the invention would present an advantage over hollow channel type collectors. The absorbed coolant cannot slosh out, and, with no need for a leak proof connection, the installation of retainer 10 is simple. Other means could be used to secure the retainer 10 to bearing race 18. For example, the inner edge of retainer flange 36 could be made simply circular, without the teeth 38, which would allow the retention groove 22 to be more shallow. It would then be necessary to separately drill or mold air vents through the retainer 10 at some point. The air vents could be located anywhere in retainer 10, however, since it does not have to be leak proof. If the inner edge of flange 36 fit tightly enough to bearing race 18 to prevent retainer 10 from rocking off axis significantly, the end edge 34 would not even have to directly abut housing face 16, leaving an open seam that would provide the necessary evaporation path. If retainer 10 were stamped from metal, then the sharp inner edges of the teeth 38 could dig into and grip the outside of bearing race 18 strongly enough to eliminate the need for retention groove 22. All told, the teeth 38 are very advantageous because they flex easily as retainer 10 is pushed on, and they also provide air vents and a constant evaporation area all around the perimeter of retainer 10. Nor do they limit the collection capacity at all, given the absorbing action of the felt ring 12. Therefore, it will be understood that it is not intended to limit the invention to just the embodiment disclosed.

The embodiments of the invention in which an exclusive property or privilege is claimed are defined as follows:

1. A drip collector for use with a vehicle coolant pump housing having a front face and a cylindrical protrusion on said face, said protrusion also having at least one coolant vent hole from which leaking coolant exits said housing, said vent hole having a predetermined axial spacing from said face, comprising,
- a generally cylindrical retainer with a cylindrical wall having a diameter larger than said protrusion and length greater than said predetermined spacing, said retainer also having a radially inwardly extending flange with a circular inner edge adapted to grip said cylindrical protrusion, thereby establishing an enclosed volume, with said annular face, into which said vent hole opens,
- at least one air vent formed through said retainer, and,
- a ring of absorbent material substantially filling said enclosed volume,
- whereby leaking coolant exiting said housing vent hole is absorbed in said ring, after which it may evaporate from said ring through said air vent.

2. A drip collector for use with a vehicle coolant pump housing having a front face and a cylindrical protrusion on said face, said protrusion also having at least one coolant vent hole from which leaking coolant exits said housing, said vent hole having a predetermined axial spacing from said face, comprising,
- a generally cylindrical retainer with a cylindrical wall having a diameter larger than said protrusion and length greater than said predetermined spacing, said retainer also having a radially inwardly extending flange with a series of circumferentially spaced teeth adapted to grip said cylindrical protrusion, thereby establishing an enclosed volume, with said annular face, into which said vent hole opens, and, a ring of absorbent material substantially filling said enclosed volume, whereby leaking coolant exiting said housing vent hole is absorbed in said ring, after which it may evaporate from said ring through the spaces between said teeth.

3. A vehicle coolant pump with improved drip collection capacity, comprising, a pump housing having a front face and a cylindrical bearing race protruding from said housing face, said bearing race also having at least one coolant vent hole from which leaking coolant exits said housing, said vent hole having a predetermined axial spacing from said face, a retention groove cut into said housing axially outboard of said vent holes, a generally cylindrical retainer with a cylindrical wall having a diameter larger than said bearing race and length greater than said predetermined spacing, said retainer also having a radially inwardly extending flange with a circular inner edge adapted to snap fit into said retention groove, thereby establishing an enclosed volume, with said annular face, into which said vent hole opens, said retainer further having at least one air vent formed therethrough, and, a ring of absorbent material substantially filling said enclosed volume, whereby, leaking coolant exiting said housing vent hole is absorbed in said ring, after which it may evaporate from said ring through said air vent.

* * * * *